Patented Nov. 29, 1932

1,889,714

UNITED STATES PATENT OFFICE

OLIVER M. URBAIN, OF COLUMBUS, OHIO, ASSIGNOR TO CHARLES H. LEWIS, OF HARPSTER, OHIO

PROCESS FOR RELEASING NASCENT HYDROGEN

No Drawing.  Application filed November 29, 1929.  Serial No. 410,657.

This invention relates to a process for releasing nascent hydrogen.

More specifically the invention contemplates the release of nascent hydrogen in a water solution by means of introducing to the solution positively charged colloids or effecting positive charging of colloids in the solution and flocculating said positively charged colloids by means of an electrolyte.

When a positively charged colloidal suspension is treated with an electrolyte in sufficient quantity to bring the colloids to the iso-electric point, nascent hydrogen will be liberated in the system. The mechanism of this action is as follows:

The colloidal particles bear a positive charge with respect to the dispersion medium and any other substances with which they are in contact. The dispersion medium must in all these cases be liquid in which a high degree of ionization of salts takes place, such, as water. The forces of mutual attraction between the colloidal particles are overcome by the repelling forces exerted between them and resulting from their having like positive charges. The cohesion and agglomeration of the particles into larger masses is thus prevented, the dispersion being in a state of stability, and the system is homogenous as far as the concentration of colloidal matter is concerned.

An electrolyte, for illustrative purposes, designated MA, is added to this stable system and it goes into solution to the extent of the limits set by its solubility or the amount needed. Ionization of this electrolyte immediately takes place with the formation in the system of positively and negatively charged ions, as for example:

$$MA = M^+ \cdots + A^- \cdots$$

The negative ions are at once attracted to the positively charged colloidal particles. The opposite charges neutralize each other, the stability of the colloids is destroyed and flocculation results. The aggregates of colloidal particles adsorb the negative ions which brought about the flocculation and are carried down by them. The equilibrium represented in the equation of the ionization of the electrolyte is destroyed, and there is left in the liquid above the mass of flocculated colloids and adsorbed anions an excess of cations. This leaves these cations, represented as $M^+ \cdots$ in the ionization equation, free to enter into a chemical reaction.

The reaction which takes place is between the cations and the water, resulting in the liberation of nascent hydrogen as per the following equation $$M^+ \cdots + nH_2O = nH^+ + M(OH)_n$$

The hydrogen thus released may be compared with the hydrogen liberated when a metal such as zinc is brought into contact with an acid. Such a system, composed of a positively charged colloid and an electrolyte, will exert at the moment of flocculation reducing powers analogous to those found in any system in which nascent hydrogen is liberated through a chemical reaction.

The following are examples of positively charged colloids which may be incorporated in a water solution to produce nascent hydrogen when flocculated with an electrolyte; hydrous ferric oxide, hydrous aluminum oxide, dyes, such as night blue, etc.

It will of course be appreciated that where the solution contains colloids capable of carrying a positive charge such charging thereof may be effected obviating the necessity for introducing extraneous colloidal matter.

The choice of the colloid employed, will, of course, depend to a large extent upon the conditions pertaining to the industries in which the process of the present invention is employed.

Electrolyte producing materials suitable for use in the process are soluble salts of the alkali and alkaline earth metals, the anions of which have a valence of two or more.

The flocculating power of exemplary electrolytes as based on the use of the colloid, hydrous aluminum oxide, concentration of colloids one hundred parts per million, is as follows:

| Electrolyte | Milli-moles per liter | Lbs. per 1000 gal. |
| --- | --- | --- |
| Sodium sulphate | 0.2 | 0.25 |
| Calcium sulphate | 0.3 | 0.36 |
| Potassium ferrocyanide | 0.05 | 0.18 |

If for example, a solution of one hundred parts per million of hydrous aluminum oxide is flocculated with an electrolyte consisting of a water solution of sodium sulphate, sixty milligrams of $SO_4$ will be adsorbed and 1.25 milligrams of nascent hydrogen will be released. The reactions are as follows:

$$Na_2SO_4 = 2\overset{++}{Na} + \overset{--}{SO_4}$$

$$2Na + 2H_2O = 2NaOH + H_2$$

It is then apparent that in order to get any desired quantity of nascent hydrogen released, it is only necessary to compute the amount of $SO_4$ which will necessarily be adsorbed and add the amount of sodium sulphate equivalent to this amount of $SO_4$. The same procedure is followed when employing other electrolytes.

The reaction when employing potassium ferrocyanide is as follows:

$$K_4Fe(CN)_6 \rightleftarrows 4\overset{+}{K} + \overset{----}{Fe(CN)_6}$$

$$4K + 4H_2O = 4KOH + 4H$$

This invention has special application to the dyeing industries and some of the metallurgical industries. In the dye industry it is often imperative that a bath remain in a reducing condition. It can be maintained in this condition by flocculating a suitable colloid in the bath solution in accordance with the teachings of this invention.

The foregoing description is illustrative only of the manner of practicing the invention and is not to be construed in a limiting sense. The scope of the invention being comprehended within the appended claims.

What I claim as my invention is:—

The process for liberating nascent hydrogen in an aqueous medium which comprises bringing together in said medium a positively charged colloid and an electrolyte in the form of a salt of an alkali metal, which releases anions for adsorption by the colloids and cations for reaction with the water of the solution.

OLIVER M. URBAIN.